United States Patent
Sébire et al.

(10) Patent No.: US 8,310,933 B2
(45) Date of Patent: Nov. 13, 2012

(54) METHOD AND A DEVICE FOR REPORTING THE NUMBER OF CORRECTLY DECODED TRANSPORT BLOCKS IN A WIRELESS SYSTEM

(75) Inventors: Benoist Sébire, Tokyo (JP); Harri Jokinen, Pertteli (FI)

(73) Assignee: Core Wireless Licensing S.a.r.l., Luxembourg (LU)

(*) Notice: Subject to any disclaimer, the term of this patent is extended or adjusted under 35 U.S.C. 154(b) by 1010 days.

(21) Appl. No.: 10/579,602

(22) PCT Filed: Nov. 16, 2004

(86) PCT No.: PCT/FI2004/000685
§ 371 (c)(1),
(2), (4) Date: Feb. 2, 2007

(87) PCT Pub. No.: WO2005/048564
PCT Pub. Date: May 26, 2005

(65) Prior Publication Data
US 2007/0275712 A1 Nov. 29, 2007

(30) Foreign Application Priority Data
Nov. 17, 2003 (FI) .................................. 20031671

(51) Int. Cl.
G01R 31/08 (2006.01)

(52) U.S. Cl. ....... 370/236; 455/69; 455/452.2; 370/341; 370/342; 370/343; 370/344; 370/345; 370/346; 370/347; 370/348; 370/349; 370/350; 714/748; 714/749; 714/750

(58) Field of Classification Search ............... 455/69, 455/452.2; 370/236, 394, 465, 474, 338; 714/748, 749, 750
See application file for complete search history.

(56) References Cited

U.S. PATENT DOCUMENTS

| | | | |
|---|---|---|---|
| 6,192,244 B1* | 2/2001 | Abbadessa | 455/436 |
| 6,711,128 B1* | 3/2004 | Ramakrishnan | 370/230 |
| 2002/0181436 A1 | 12/2002 | Mueckenheim et al. | 370/349 |
| 2004/0028020 A1* | 2/2004 | Frederiksen et al. | 370/342 |
| 2004/0102205 A1* | 5/2004 | Zhang et al. | 455/522 |
| 2004/0114574 A1* | 6/2004 | Zeira et al. | 370/352 |
| 2005/0063344 A1* | 3/2005 | Winzell | 370/335 |

FOREIGN PATENT DOCUMENTS

| | | |
|---|---|---|
| EP | 1 494 370 A1 | 1/2001 |
| EP | 1 286 489 A2 | 2/2003 |
| WO | WO 00/36782 | 6/2000 |
| WO | WO-03/049320 A1 | 6/2003 |
| WO | WO 03/069819 A1 | 8/2003 |

* cited by examiner

Primary Examiner — Jean Gelin
Assistant Examiner — Amanuel Lebassi

(57) ABSTRACT

A method and a device for reporting the number of correctly decoded transport blocks in a wireless system. The maximum number of correctly decoded transport blocks within a reporting period is determined. Then the actual number of correctly decoded transport blocks is determined and cultivated into an indication thereof on the basis of the maximum number. The indication is sent to a network element capable of decoding it for analysis.

35 Claims, 6 Drawing Sheets

METHOD AND A DEVICE FOR REPORTING THE NUMBER OF CORRECTLY DECODED TRANSPORT BLOCKS IN A WIRELESS SYSTEM

FIELD OF THE INVENTION

The present invention relates generally to communication system. In particular the invention concerns GERAN (GSM/EDGE Radio Access Network) radio access network and air interface thereof in which a special type of physical layer called flexible layer one (FLO) is utilized.

BACKGROUND OF THE INVENTION

Modern wireless communication systems such as GSM (Global System for mobile communications) and UMTS (Universal Mobile Telecommunications System) are capable of transferring various types of data over the air interface between the network elements such as a base station and a mobile station (MS). As the general demand for transfer capacity continuously rises due to e.g. new multimedia services coming available, new more efficient techniques have been developed in order to exploit the existing resources to a maximum extent.

A technical report 3GPP 45.902 [1] discloses a concept of flexible layer one, a new physical layer proposed for the GERAN. The ingenuity of the concept relies on the fact that the configuration of the physical layer including e.g. channel coding and interleaving is specified not until the call set-up. Thus, the support of new services can be handled smoothly without having to specify new coding configuration schemes separately in connection with each release.

Development work of the FLO concept has been provided with somewhat strict requirements. FLO should, for example, support multiplexing of parallel data flows on to a basic physical subchannel and provide optimisation of spectral efficiency through the support of different interleaving depths, unequal error protection/detection, reduced channel coding rate granularity and support of different (8PSK, GMSK etc) modulations. Moreover, the solution shall be future proof and minimize the overhead introduced by the radio protocol stack.

According to the GERAN Release 5 the MAC sublayer (Layer 2 for FLO) handles the mapping between the logical channels (traffic or control) and the basic physical subchannels introduced in 3GPP TS 45.002 [2].

In UTRAN (UMTS Radio Access Network), the MAC utilizes so-called Transport Channels TrCH for transferring data flows with given QoS's (Quality of Service) over the air interface. As a result, several transport channels, that are configured at call set-up, can be active at the same time and be multiplexed at the physical layer.

Now, by adopting the idea of FLO, aforesaid flexible transport channels can be utilized in GERAN as well. Accordingly, the physical layer of GERAN may offer one or several transport channels to the MAC sublayer. Each of these transport channels can carry one data flow providing a certain Quality of Service (QoS). A number of transport channels can be multiplexed and sent on the same basic physical subchannel at the same time.

The configuration of a transport channel i.e. the number of input bits, channel coding, interleaving etc. is denoted as a Transport Format (TF). Furthermore, a number of different transport formats can be associated to a single transport channel. The configuration of the transport formats is completely controlled by the RAN (Radio Access Network) and signalled to the MS at call set-up. Correct interpretation of the TF is crucial at the receiving end as well as the transport format defines the utilized configuration for decoding of the data. When configuring a transport format, the RAN can, for example, choose between a number of predefined CRC (Cyclic Redundancy Check) lengths and block lengths.

On transport channels, transport blocks (TB) are exchanged between the MAC sublayer and the physical layer on a transmission time interval (TTI) basis. For each TTI a transport format is chosen and indicated through the transport format indicator (TFIN). In other words, the TFIN tells which transport format to use for that particular transport block on that particular TrCH during that particular TTI. When a transport channel is inactive, the transport format with a transport block size of zero (empty transport format) is selected.

Only a limited number of combinations of the transport formats of the different transport channels are allowed. A valid combination is called a Transport Format Combination (TFC). The set of valid TFCs on a basic physical subchannel is called a Transport Format Combination Set (TFCS). The TFCS is signalled through Calculated Transport Format Combinations (CTFC).

In order to decode a received sequence the receiver needs to know the active TFC for the radio packet. This information is transmitted in the Transport Format Combination Identifier (TFCI) field. Aforesaid field is basically a layer 1 header and has the same function as the stealing bits in GSM. Each of the TFC within a TFCS is assigned a unique TFCI value and upon receipt of a radio packet this is the first element to be decoded by the receiver. By exploiting the decoded TFCI value the transport formats for the different transport channels can be determined and the actual decoding can start.

In case of multislot operation, there shall be one FLO instance for each basic physical subchannel. Each FLO instance is configured independently by Layer 3 and gets an own TFCS as a result. The number of allocated basic physical subchannels depends on the multislot capabilities of the MS.

For the time being the use of FLO is planned to be limited to dedicated channels only, thus maintaining the 26-multiframe structure for which the SACCH (Slow Associated Control Channel) shall be treated as a separate logical channel based on GERAN Release 5.

The concept of transport formats and channels as presented in reference [1] is visualized in FIG. 1 where e.g. coded speech is to be transmitted over FLO. Speech is transferred by using three different modes MODE 1, MODE 2, MODE 3 with different bit rates and an additional comfort noise generation mode CNG MODE. Inside a mode the speech bits have been divided into three different classes represented by three transport channels TrCHA 102, TrCHB 104, and TrCHC 106 on the basis of their varying importance during the speech reconstruction stage, for example. Numbers inside the blocks, see e.g. the black pointed by legend 108, being arbitrary in this example though, indicate the required number of bits in a transport channel and codec mode specific manner. Hence, it can be noticed from the figure that TrCHA contains four transport formats (0, 60, 40, 30), TrCHB three transport formats (0, 20, 40) and TrCHC only two formats (0, 20). Resulting transport format combinations TFC1-TFC4, that refer to transport formats on different channels that can be active at the same time, are depicted with dotted lines in the figure. All these valid combinations constitute the TFCS that is signalled through CTFC. An example of CTFC determination is found in reference [1] in addition to techniques applicable in proper TFC selection.

A protocol architecture of FLO in case of Iu mode is depicted in FIG. 2 wherein MAC layer 208 maps either a plurality of logical channels or TBFs (temporary block flows) from RLC entities located in RLC layer 206, said RLC layer 206 receiving data from e.g. PDCP 204 (Packet Data Convergence Protocol) and controlled by RRC (Radio Resource Controller) 202, to physical layer 210. In current specification [1] logical channels are used but are presumably to be replaced with the concept of temporary block flows in the future. TBF concept is described in reference [3] in more detail. A dedicated channel (DCH) can be used as a transport channel dedicated to one MS in uplink or downlink direction. Three different DCHs have been introduced: CDCH (Control-plane DCH), UDCH (User-plane DCH) and ADCH (Associated DCH), the CDCH and UDCH of which used for transmission of RLC/MAC data transfer blocks, whereas the ADCH targeted for transmission of RLC/MAC control blocks. A mobile station may concurrently have a plurality of transport channels active.

The FLO architecture is illustrated in FIG. 3 especially in relation to Layer 1 for FLO. In this version only a one-step interleaving has been assumed, i.e. all transport channels on one basic physical subchannel have the same interleaving depth. An alternative architecture with two-step interleaving is disclosed in reference [1] for review. Basic error detection is carried out with a cyclic redundancy check. A Transport Block is inputted to error detection 302 that utilizes a selected generator polynomial in order to calculate the checksum to be attached to the block. Next, the updated block called Code Block is fed into a convolutional channel coder 304 introducing additional redundancy to it. In rate matching 306 bits of an Encoded Block are either repeated or punctured. As the block size can vary, also the number of bits on a transport channel may correspondingly fluctuate. Thereupon, bits shall be repeated or punctured in order to keep the overall bit rate in line with the actual allocated bit rate of the corresponding sub-channel. Output from rate matching block 306 is a called a Radio Frame. Transport channel multiplexing 308 takes care of multiplexing of Radio Frames from active transport channels TrCH(i) ... TrCH(1) received from matching block 306 into a CCTrCH (Coded Composite Transport Channel). In TFCI mapping 310 a TFCI is constructed for the CCTrCH. The size of the TFCI depends on the number of TFCs needed. The size should be minimized in order to avoid unnecessary overhead over the air interface. For example, a TFCI of 3 bits can indicate 8 different transport format combinations. If these are not enough, a dynamic connection reconfiguration is needed to be performed. The TFCI is (block) coded and then interleaved 312 with CCTrCH (these two constituting a Radio Packet) on bursts. The selected interleaving technique is configured at call set-up.

RRC layer, Layer 3 for FLO, manages set-up, reconfiguration and release of the traffic channels. Upon creating a new connection, Layer 3 indicates to the lower layers various parameters to configure the physical, MAC and RLC layers. Parameters include the transport channel identity (TrCH Id) and transport format set for each transport channel, transport format combination set through CTFC with modulation parameter etc. In addition, Layer 3 provides transport channel specific parameters such as CRC size, rate matching parameters, transport format dynamic attributes etc. The transport channels and the transport format combination set are separately configurable in the uplink and downlink directions by utilizing e.g. Radio Bearer procedures disclosed in sections 7.14.1 and 7.19 of reference [4] in more detail.

Furthermore, Layer 3 may include information about transport format combination subset(s) to further restrict the use of transport format combinations within the TFCS. Such information may be formed via a "minimum allowed transport format combination index", an "allowed transport format combination list", a "non-allowed transport formation combination list" etc.

Clearly also incremental TFCS reconfiguration should be possible in FLO, i.e. information only about transport channels or TFCs that are added, modified or deleted could be signalled by e.g. modified Radio Bearer signalling. After various reconfigurations, the overall configuration should still be consistent, which could be assured by, for example, removing all TFCs from the TFCS that utilize a transport channel to be released.

Current specifications [4], [5], and [6] concerning link control and especially RRC protocol in GERAN describe how, in connection with enhanced measurement reporting, the terminal reports on the SACCH to the network the number of correctly decoded blocks with NBR_RCVD_BLOCKS parameter embedded in ENHANCED MEASUREMENT REPORT message. The network may then assess the block error rate (BLER) after decoding. On one DBPSCH, the maximum number of blocks within a SACCH reporting period is normally 24. Likewise, the maximum value of the number of correctly decoded blocks is 24, and an unambiguous binary representation thereof requires 5 bits, i.e. $2^5=32$ (>24), in which case 8 values are in principle left unused.

Due to the adoption of FLO in GERAN, a maximum of 24 radio packets can be received during a SACCH reporting period but every radio packet may contain up to four transport blocks, according to the current consensus, and thus, a total of 24×4 transport blocks may be correctly decoded during a SACCH reporting period. This is derived from the present limitation set for FLO requirements according to which the FLO shall support a maximum of 4 active transport channels (–>transport blocks) per radio packet per basic physical subchannel. Therefore the already fixed five bits for a NBR_RCVD_BLOCKS parameter is not enough for unequivocally representing the number of (correctly) decoded blocks. Although new messages and parameters could be defined to overcome the need for a lengthened parameter, such modifications are not preferred as they require changes both to a number of specifications and to devices (terminals and network elements) actually following those, and, in addition, increase the amount of data transmitted over the air interface.

SUMMARY OF THE INVENTION

The object of the present invention is to enable reporting of the number of correctly decoded transport blocks in a wireless system using the FLO or corresponding concept without increasing the overhead over the air interface. The object is achieved by utilizing the aforesaid actual existing reporting procedure as to the actual message definition, parameters, and parameter sizes. However, the meaning of bits in the NBR_RCVD_BLOCKS parameter is updated to change adaptively depending on the maximum number of correctly decoded transport blocks during a reporting period. In a basic solution of the invention the least significant bits (LSB) of the binary representation of the number of correctly decoded blocks are truncated whenever needed in order to fit said representation to the fixed number of bits (5) in the NBR_RCVD_BLOCKS parameter. Also other additional or alternative mappings between the original representation and the parameter can be used. E.g. a non-linear reporting scale may be exploited to change the reporting resolution according to the number of correctly decoded blocks.

The utility of the invention is based on a plurality of issues. First, the existing procedures for sending and receiving the reporting information are still applicable and changes to message/parameter structures/sizes are not required. Secondly, the resolution on which the number of correctly received blocks is reported is adaptive; it can be adjusted to provide a finer grid in some specific scenarios related to some particular number (range) of received blocks or to generally degrade when the maximum number of received blocks increases. Furthermore, the provided solution is somewhat straightforward to implement and does not substantially require more processing power or memory space in the executing device than the prior art technique. Additional signalling between the ends of as connection is not required for utilizing the invention.

According to the invention, a method for reporting the number of correctly decoded transport blocks in a wireless system adapted to transfer data in radio packets over the air interface thereof, where a number of transport blocks associated with a number of transport channels are included in a radio packet and a number of packets received during a reporting period, is characterized in that it has the steps of
    obtaining information about the maximum number of correctly decoded transport blocks during the reporting period,
    obtaining the number of correctly decoded transport blocks during the reporting period,
    adapting an indication about said number of correctly decoded transport blocks during the reporting period on the basis of the obtained information, and
    sending said indication about said number of correctly decoded transport blocks during the reporting period.

In another aspect of the invention, a device operable in a wireless system adapted to receive a number of transport blocks included in a radio packet, a number of radio packets received during a reporting period, said device comprising processing means and memory means configured to process and store instructions and data, and data transfer means configured to transfer data, is characterized in that it is adapted to
    obtain information about the maximum number of correctly decoded transport blocks during the reporting period,
    obtain the number of correctly decoded transport blocks during the reporting period,
    adapt an indication about said number of correctly decoded transport blocks during the reporting period on the basis of the obtained information, and to
    send said indication about said number of correctly decoded transport blocks during the reporting period.

In a further aspect of the invention, a device operable in a wireless system adapted to transfer data in radio packets over the air interface thereof, a number of transport blocks included in a radio packet and a number of radio packets transferred during a reporting period, said device comprising processing means and memory means configured to process and store instructions and data, and data transfer means configured to transfer data, is characterized in that it is adapted to
    obtain information about the maximum number of transport blocks transferred to a terminal during the reporting period,
    receive an indication about the number of correctly decoded transport blocks during the reporting period by the terminal, and to,
    on the basis of the information obtained and the indication received, determine the actual number of correctly decoded transport blocks.

The term "adapting" refers herein especially to fitting an indication into a transferable form according to the obtained information. Moreover, also some other issues such as a predefined data field length, in addition to the obtained information, may affect the adaptation. For example, if the indication is an adaptively truncated binary representation of the corresponding number like in the basic solution of the invention, both the maximum possible numeric range (~maximum number of correctly received blocks) and the predefined length of the indication parameter to be sent determine the final form of the indication.

In one embodiment of the invention, a mobile terminal exploits the proposed method for reporting the number of correctly decoded transport blocks during a reporting period. The mobile terminal determines on the basis of the maximum number of decoded transport blocks a proper indication model and, accordingly, transmits a parameter indicating the measured number of correctly decoded blocks to the network. A network element then receives the parameter and decodes it on the basis of information available about the maximum number of transport blocks transferred during the reporting period.

Dependent claims disclose embodiments of the invention.

BRIEF DESCRIPTION OF THE DRAWINGS

Hereinafter the invention is described in more detail by reference to the attached drawings, wherein FIG. 1 discloses a visualization of a TFCS structure.

DETAILED DESCRIPTION OF THE EMBODIMENT OF THE INVENTION

Figure 1:
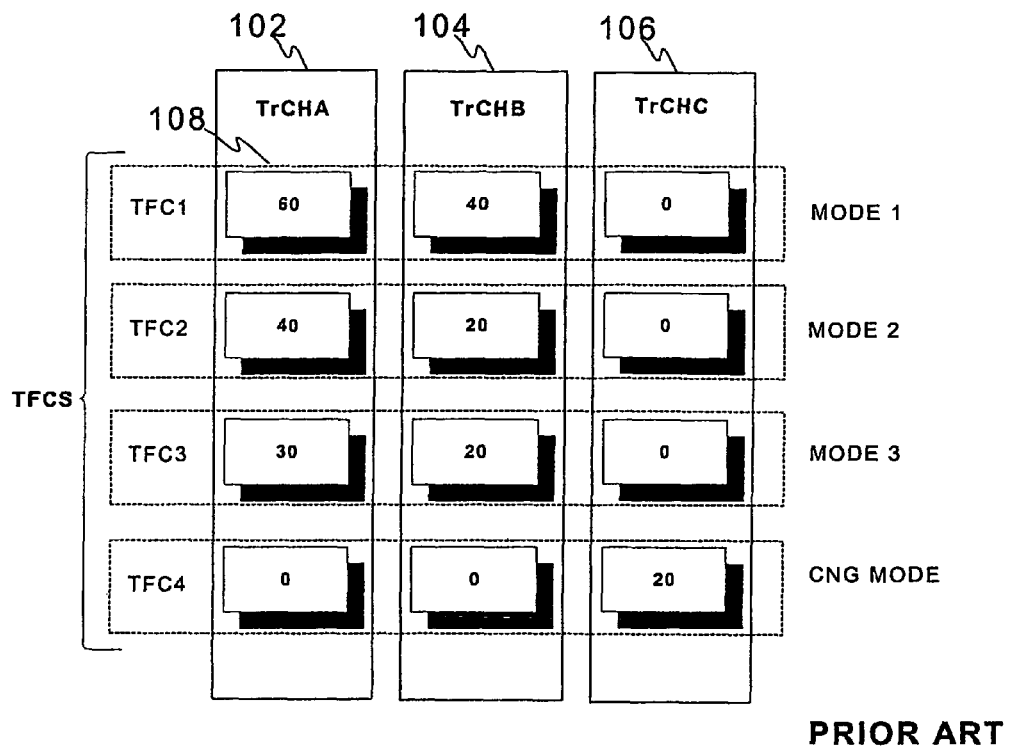
Figure 2:
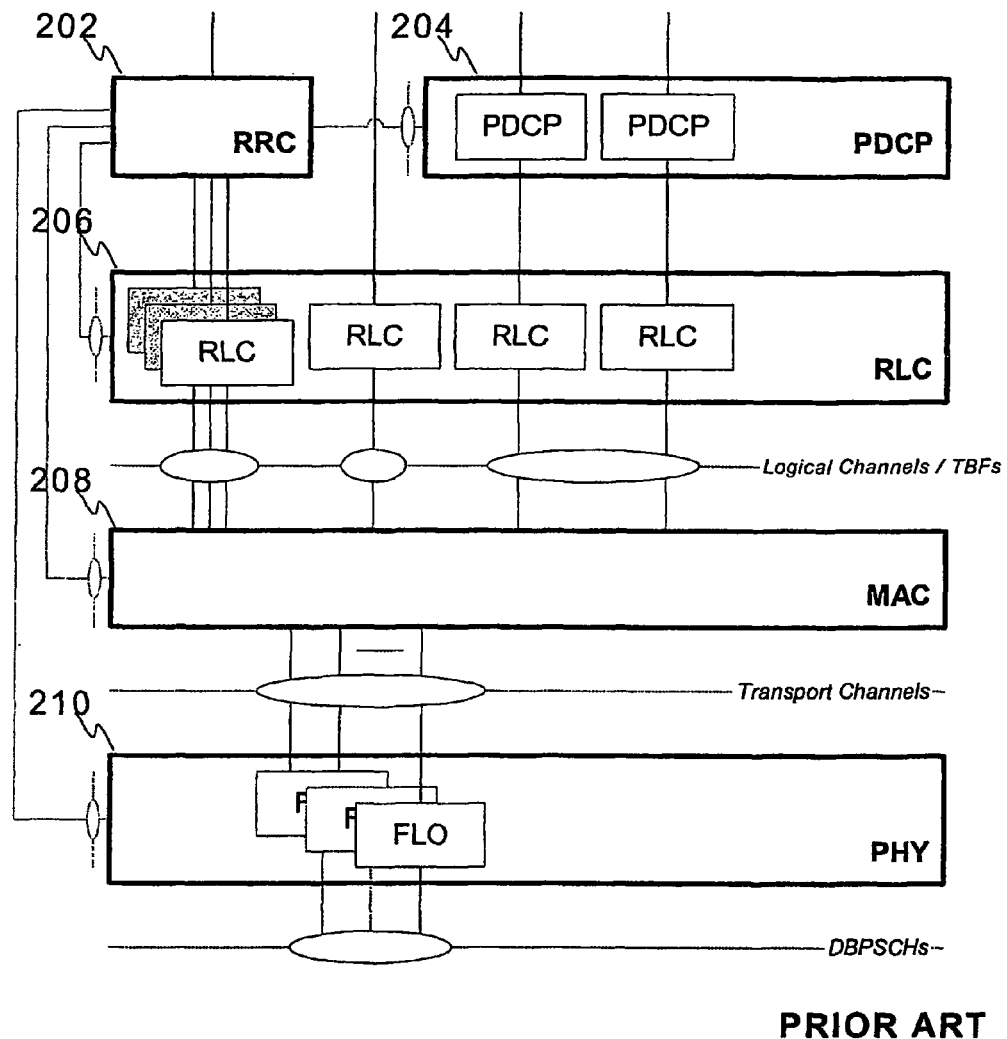
FIG. 2 illustrates FLO protocol architecture in GERAN Iu mode.
Figure 3:
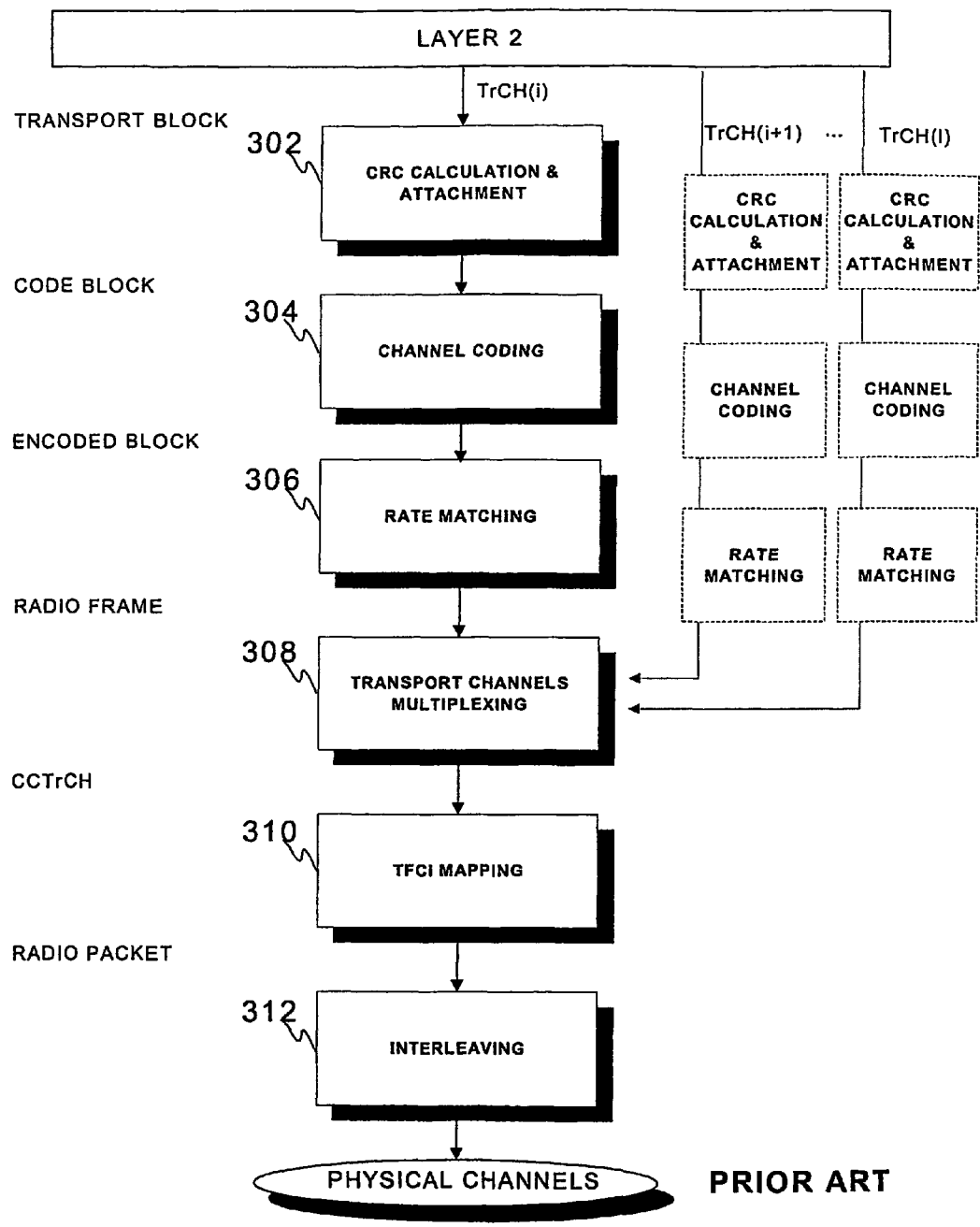
FIG. 3 illustrates FLO architecture.

FIGS. 1, 2, and 3 were already discussed in conjunction with the description of related prior art.

Figure 4A:
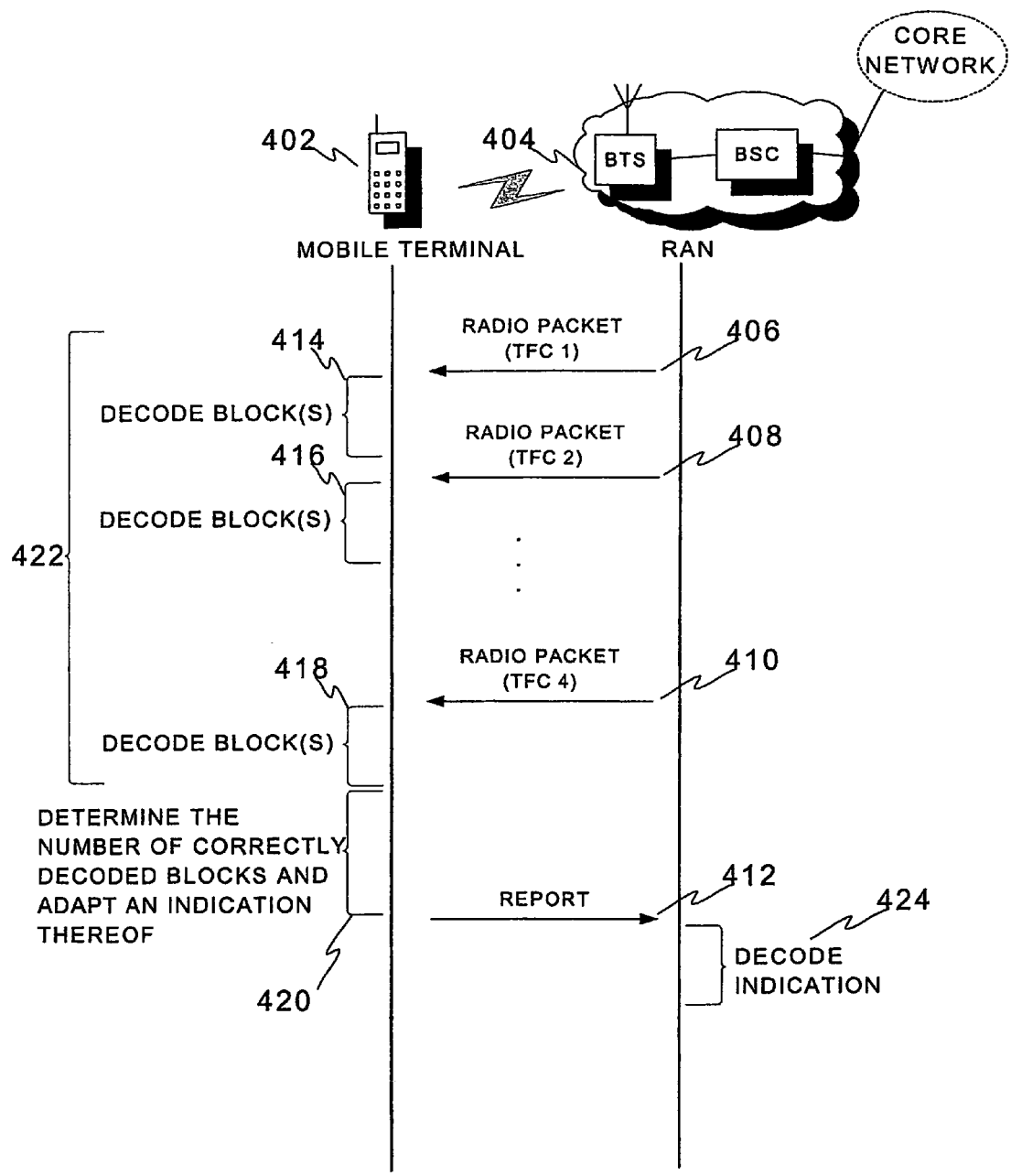
FIG. 4A is a signalling chart of the embodiment of the invention.

FIG. 4A discloses, by way of example only, a signalling chart describing the scenario of the embodiment of the invention in which mobile terminal 402 receives radio packets from network 404. Radio packets 406, 408, and 410 are received during a reporting period indicated by reference sign 422. Terminal 402 decodes 414, 416, and 418 the block(s) included in the packets, which may mean, for example, simple reception and demodulation of data into exploitable form or, if a CRC is used in the block(s), more sophisticated comparison of (re)calculated CRC value with its received counterpart.

After receiving (and decoding) the blocks included in the packets during the reporting period terminal 402 determines 420 the number of correctly decoded blocks within the period, adapts an indication thereof and reports 412 the indication to network 404. Network 404 determines 424 said number on the basis of the received indication and knowledge about the current TFC structure (maximum number of decoded blocks during a reporting period with possible additional conditions, explained hereinafter).

In order to keep existing messages as they are (with a 5 bits NBR_RCVD_BLOCKS parameter), the least significant bit (s) of the binary representation of the number of correctly decoded transport blocks can be truncated. The result is then mapped to NBR_RCVD_BLOCKS.

The number of truncated LSBs depends on the maximum number of correctly decoded transport blocks during a SACCH reporting period; such maximum can be indicated via e.g. NbTBmax parameter.

To further expand on the concept of NbTBmax and considering especially a SACCH reporting period, a maximum of 24 radio packets can be received. Then the maximum number of transport blocks that can be correctly decoded in a radio packet depends on the TFCS of the DBPSCH. NbTBmax can be calculated as NbTBmax=24×(the maximum number of active transport channels in a TFC of the TFCS of the DBPSCH), where transport channel is basically considered as active in a particular TFC if it carries a transport block that really is transferred, i.e. the size of which is >0. Notation × denotes multiplication. Possibly some supplementary conditions are also used for further determining the NbTBmax parameter. For example, only the transport blocks (~transport channels) for which a CRC is used (refer to CODE BLOCK in FIG. 3) may be included in the NbTBmax. On the other hand, signalling TFC, being e.g. the first TFC with e.g. TFCI=0, may be excluded from the NbTBmax calculations.

Figure 4B:
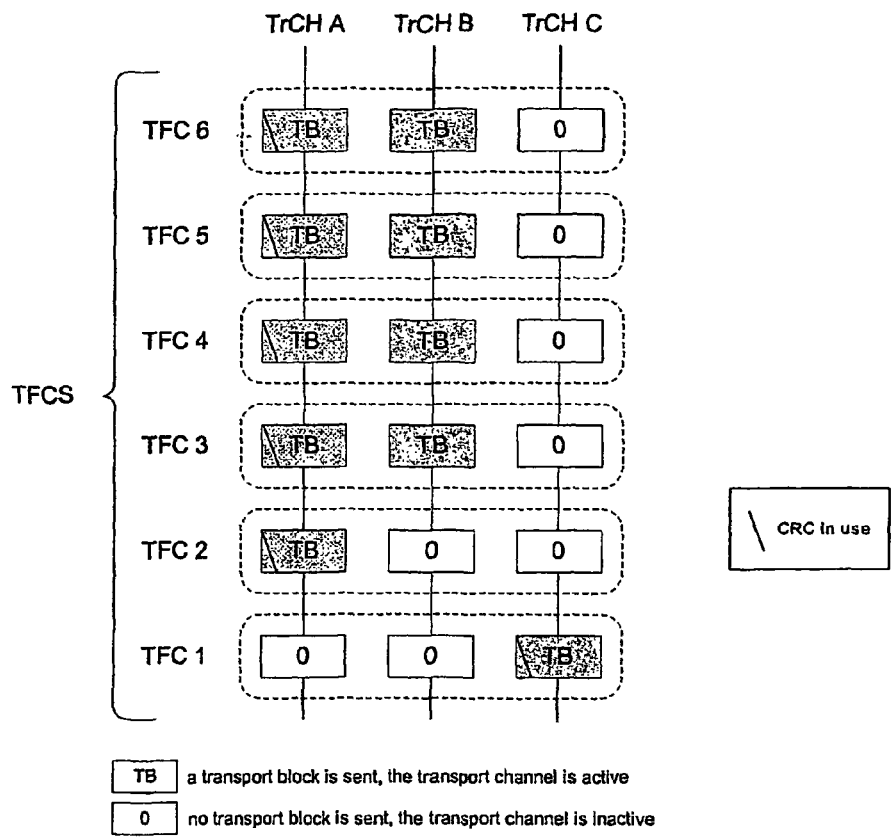
FIG. 4B is a visualization of a scenario in which six TFCs and three transport channels are included in a TFCS.

FIG. 4B depicts an example of an TFCS where six TFCs are defined for FLO on a DBPSCH. In this example, it is assumed that only transport channel A and transport channel C use a CRC. The maximum number of active transport channel for which a CRC is used in a TFC is therefore 1. Consequently, NbTBmax=24×1=24.

Figure 4C:
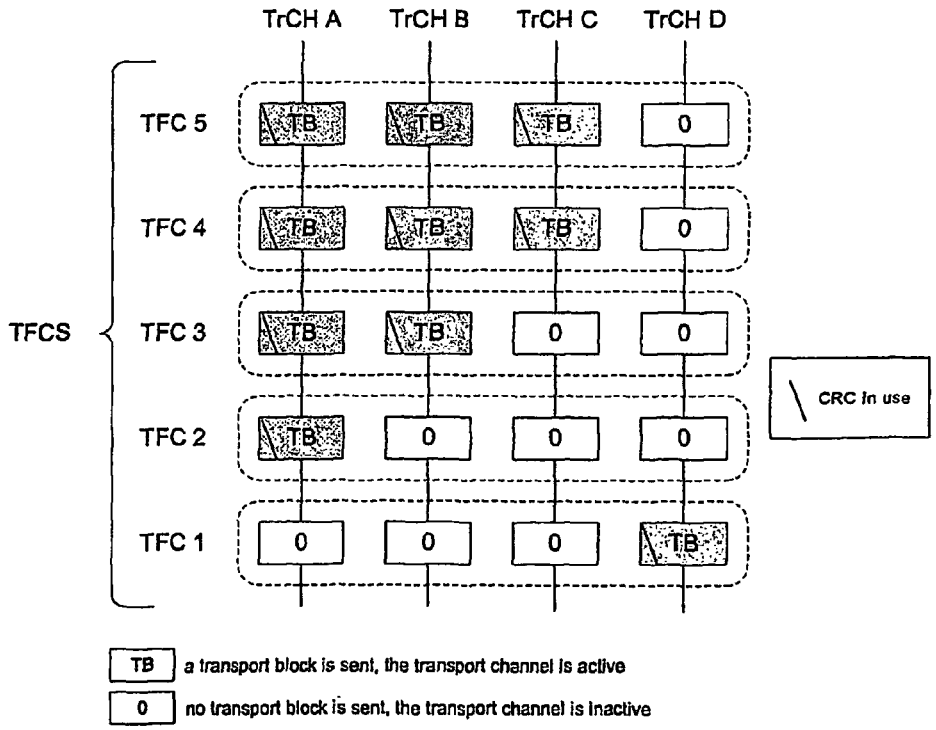
FIG. 4C is a visualization of a corresponding scenario with five TFCs and four transport channels instead.

FIG. 4C depicts another example of TFCS where five TFCs are defined for FLO on a DBPSCH. In this example, it is assumed that all transport channels A, B, C and D use a CRC. The maximum number of active transport channel for which a CRC is used in a TFC is therefore 3 (TFC 5). Consequently, NbTBmax=24×3=72.

Once NbTBmax is known, the number of bits that need to be truncated from the 5 bit binary representation of the number of correctly decoded transport blocks can easily be calculated according to Table 1 below.

TABLE 1

| $NbTB_{max}$ | Truncation |
|---|---|
| 0-31 | none - direct binary representation possible |
| 32-63 | 1 LSB - see Table 2 |
| 64-96 | 2 LSB - see Table 3 |

Since the number of LSB to be truncated can be calculated by the terminal from the TFCS it receives from the network at call setup, there is no need to explicitly signal it, although it can be done via e.g. a separate parameter in a new/existing message. Both ends know the TFCS and both ends know how many bits are truncated from the binary representation of the number of correctly decoded transport blocks (0, 1 or 2) to fit in NBR_RCVD_BLOCKS.

Additionally, at call set-up for example, the network may order the terminal (by sending a request etc) to take into account only a subset of the transport channels. For instance in FIG. 4C, the network may tell the terminal to monitor the decoding success on channels TrCH A and B. The maximum number of active transport channel (A and/or B) in a TFC is then 2. Consequently, NbTBmax=24×2=48 and 1 bit truncation is required (see Table 1).

Corresponding to the determination of NbTBmax, counting of the effective number of correctly decoded transport blocks utilizes similar principles. Blocks in a signalling TFC may not be regarded to be included in said number. For instance in FIG. 4B and FIG. 4C, the first TFC (TFC1 with e.g. TFCI=0) can be reserved for signalling. Moreover, transport blocks can be considered as correctly decoded according to the CRC received. If there is no CRC in a block, however, the block is not counted either unless the TFCS (possibly excluding the signalling TFC) does not contain a TFC for which at least one transport channel that uses a CRC is active, in which case all received transport blocks may be considered as correctly decoded. Hence, CRC may be exploited whenever available, otherwise counting is based on reception only, for example.

See Tables 2 and 3 depicting truncation of 1 and 2 LSBs respectively.

TABLE 2

Truncation of the LSB

| Received Blocks | bit 6 | bit 5 | bit 4 | bit 3 | bit 2 | |
|---|---|---|---|---|---|---|
| | | | NBR_RCVD_BLOCKS | | | |
| | bit 5 | bit 4 | bit 3 | bit 2 | bit 1 | bit 1 |
| 0 or 1 | 0 | 0 | 0 | 0 | 0 | 0 or 1 |
| 2 or 3 | 0 | 0 | 0 | 0 | 1 | 0 or 1 |
| 4 or 5 | 0 | 0 | 0 | 1 | 0 | 0 or 1 |
| 6 or 7 | 0 | 0 | 0 | 1 | 1 | 0 or 1 |
| 8 or 9 | 0 | 0 | 1 | 0 | 0 | 0 or 1 |
| 10 or 11 | 0 | 0 | 1 | 0 | 1 | 0 or 1 |
| 12 or 13 | 0 | 0 | 1 | 1 | 0 | 0 or 1 |
| 14 or 15 | 0 | 0 | 1 | 1 | 1 | 0 or 1 |
| 16 or 17 | 0 | 1 | 0 | 0 | 0 | 0 or 1 |
| 18 or 19 | 0 | 1 | 0 | 0 | 1 | 0 or 1 |
| 20 or 21 | 0 | 1 | 0 | 1 | 0 | 0 or 1 |
| 22 or 23 | 0 | 1 | 0 | 1 | 1 | 0 or 1 |
| 24 or 25 | 0 | 1 | 1 | 0 | 0 | 0 or 1 |
| 26 or 27 | 0 | 1 | 1 | 0 | 1 | 0 or 1 |
| 28 or 29 | 0 | 1 | 1 | 1 | 0 | 0 or 1 |
| 30 or 31 | 0 | 1 | 1 | 1 | 1 | 0 or 1 |
| 32 or 33 | 1 | 0 | 0 | 0 | 0 | 0 or 1 |
| 34 or 35 | 1 | 0 | 0 | 0 | 1 | 0 or 1 |
| 36 or 37 | 1 | 0 | 0 | 1 | 0 | 0 or 1 |
| 38 or 39 | 1 | 0 | 0 | 1 | 1 | 0 or 1 |
| 40 or 41 | 1 | 0 | 1 | 0 | 0 | 0 or 1 |
| 42 or 43 | 1 | 0 | 1 | 0 | 1 | 0 or 1 |
| 44 or 45 | 1 | 0 | 1 | 1 | 0 | 0 or 1 |
| 46 or 47 | 1 | 0 | 1 | 1 | 1 | 0 or 1 |
| 48 or 49 | 1 | 1 | 0 | 0 | 0 | 0 or 1 |
| 50 or 51 | 1 | 1 | 0 | 0 | 1 | 0 or 1 |
| 52 or 53 | 1 | 1 | 0 | 1 | 0 | 0 or 1 |
| 54 or 55 | 1 | 1 | 0 | 1 | 1 | 0 or 1 |
| 56 or 57 | 1 | 1 | 1 | 0 | 0 | 0 or 1 |
| 58 or 59 | 1 | 1 | 1 | 0 | 1 | 0 or 1 |
| 60 or 61 | 1 | 1 | 1 | 1 | 0 | 0 or 1 |
| 62 or 63 | 1 | 1 | 1 | 1 | 1 | 0 or 1 |

TABLE 3

Truncation of 2 LSBs

| Received Blocks | bit 7 | bit 6 | bit 5 | bit 4 | bit 3 | | |
|---|---|---|---|---|---|---|---|
| | | | NBR_RCVD_BLOCKS | | | | |
| | bit 5 | bit 4 | bit 3 | bit 2 | bit 1 | bit 2 | bit 1 |
| 0, 1, 2 or 3 | 0 | 0 | 0 | 0 | 0 | 0 or 1 | 0 or 1 |
| 4, 5, 6 or 7 | 0 | 0 | 0 | 0 | 1 | 0 or 1 | 0 or 1 |
| 8, 9, 10 or 11 | 0 | 0 | 0 | 1 | 0 | 0 or 1 | 0 or 1 |
| 12, 13, 14 or 15 | 0 | 0 | 0 | 1 | 1 | 0 or 1 | 0 or 1 |
| 16, 17, 18 or 19 | 0 | 0 | 1 | 0 | 0 | 0 or 1 | 0 or 1 |
| 20, 21, 22 or 23 | 0 | 0 | 1 | 0 | 1 | 0 or 1 | 0 or 1 |

TABLE 3-continued

Truncation of 2 LSBs

| | bit 7 | bit 6 | bit 5 | bit 4 | bit 3 | | |
| | | | NBR_RCVD_BLOCKS | | | | |
| Received Blocks | bit 5 | bit 4 | bit 3 | bit 2 | bit 1 | bit 2 | bit 1 |
| --- | --- | --- | --- | --- | --- | --- | --- |
| 24, 25, 26 or 27 | 0 | 0 | 1 | 1 | 0 | 0 or 1 | 0 or 1 |
| 28, 29, 30 or 31 | 0 | 0 | 1 | 1 | 1 | 0 or 1 | 0 or 1 |
| 32, 33, 34 or 35 | 0 | 1 | 0 | 0 | 0 | 0 or 1 | 0 or 1 |
| 36, 37, 38 or 39 | 0 | 1 | 0 | 0 | 1 | 0 or 1 | 0 or 1 |
| 40, 41, 42 or 43 | 0 | 1 | 0 | 1 | 0 | 0 or 1 | 0 or 1 |
| 44, 45, 46 or 47 | 0 | 1 | 0 | 1 | 1 | 0 or 1 | 0 or 1 |
| 48, 49, 50 or 51 | 0 | 1 | 1 | 0 | 0 | 0 or 1 | 0 or 1 |
| 52, 53, 54 or 55 | 0 | 1 | 1 | 0 | 1 | 0 or 1 | 0 or 1 |
| 56, 57, 58 or 59 | 0 | 1 | 1 | 1 | 0 | 0 or 1 | 0 or 1 |
| 60, 61, 62 or 63 | 0 | 1 | 1 | 1 | 1 | 0 or 1 | 0 or 1 |
| 64, 65, 66 or 67 | 1 | 0 | 0 | 0 | 0 | 0 or 1 | 0 or 1 |
| 68, 69, 70 or 71 | 1 | 0 | 0 | 0 | 1 | 0 or 1 | 0 or 1 |
| 72, 73, 74 or 75 | 1 | 0 | 0 | 1 | 0 | 0 or 1 | 0 or 1 |
| 76, 77, 78 or 79 | 1 | 0 | 0 | 1 | 1 | 0 or 1 | 0 or 1 |
| 80, 81, 82 or 83 | 1 | 0 | 1 | 0 | 0 | 0 or 1 | 0 or 1 |
| 84, 85, 86 or 87 | 1 | 0 | 1 | 0 | 1 | 0 or 1 | 0 or 1 |
| 88, 89, 90 or 91 | 1 | 0 | 1 | 1 | 0 | 0 or 1 | 0 or 1 |
| 92, 93, 94 or 95 | 1 | 0 | 1 | 1 | 1 | 0 or 1 | 0 or 1 |
| 96, 97, 98 or 99 | 1 | 1 | 0 | 0 | 0 | 0 or 1 | 0 or 1 |
| 100, 101, 102 or 103 | 1 | 1 | 0 | 0 | 1 | 0 or 1 | 0 or 1 |
| 104, 105, 106 or 107 | 1 | 1 | 0 | 1 | 0 | 0 or 1 | 0 or 1 |
| 108, 109, 110 or 111 | 1 | 1 | 0 | 1 | 1 | 0 or 1 | 0 or 1 |
| 112, 113, 114 or 115 | 1 | 1 | 1 | 0 | 0 | 0 or 1 | 0 or 1 |
| 116, 117, 118 or 119 | 1 | 1 | 1 | 0 | 1 | 0 or 1 | 0 or 1 |
| 120, 121, 122 or 123 | 1 | 1 | 1 | 1 | 0 | 0 or 1 | 0 or 1 |
| 124, 125, 126 or 127 | 1 | 1 | 1 | 1 | 1 | 0 or 1 | 0 or 1 |

By utilizing the above tables the binary representation of the number of correctly decoded transport blocks is adapted to a 5 bit long indication parameter by truncating the LSB(s) and thus, the original resolution of said number is halved/quartered during the adaptation.

As a simple alternative to the above truncation or other adaptation techniques applied to the number of correctly decoded transport blocks in order to fit the number into a parameter with limited length (like 5 bits), it's always possible to count said number for a single transport channel only. Selection of such transport channel can be, for example, signalled by the network to the terminal at call set-up, or
automatic, e.g. the first one utilizing a CRC is selected.

When only one transport channel is counted, the maximum number of correctly decoded (transport) blocks during a SACCH reporting period remains at 24.

As another supplementary or fully independent adoption method a non-linear reporting scale is presented. The scale would be made in a way that the reporting resolution is higher for some numbers, for example:

for the range where all blocks are sent and a low number of blocks are incorrect (i.e. for typical conditions);
and eventually for the range where only a few correct blocks are correctly decoded (i.e for the DTX (discontinuous transmission) case where only a few blocks per reporting period have been sent).

An example of aforesaid scale is given in Table 4.

TABLE 4

Non-linear mapping

| | NBR_RCVD_BLOCKS | | | | |
| Received Blocks | bit 5 | bit 4 | bit 3 | bit 2 | bit 1 |
| --- | --- | --- | --- | --- | --- |
| 0 | 0 | 0 | 0 | 0 | 0 |
| 1 | 0 | 0 | 0 | 0 | 1 |

TABLE 4-continued

Non-linear mapping

| | NBR_RCVD_BLOCKS | | | | |
| Received Blocks | bit 5 | bit 4 | bit 3 | bit 2 | bit 1 |
| --- | --- | --- | --- | --- | --- |
| 2 | 0 | 0 | 0 | 1 | 0 |
| 3, 4 | 0 | 0 | 0 | 1 | 1 |
| 5, 6 | 0 | 0 | 1 | 0 | 0 |
| 7, 8 | 0 | 0 | 1 | 0 | 1 |
| 9, 10 | 0 | 0 | 1 | 1 | 0 |
| 11, 12 | 0 | 0 | 1 | 1 | 1 |
| 13, 14 | 0 | 1 | 0 | 0 | 0 |
| 15, 16 | 0 | 1 | 0 | 0 | 1 |
| 17, 18 | 0 | 1 | 0 | 1 | 0 |
| 19 | 0 | 1 | 0 | 1 | 1 |
| 20 | 0 | 1 | 1 | 0 | 0 |
| 21 | 0 | 1 | 1 | 0 | 1 |
| 22 | 0 | 1 | 1 | 1 | 0 |
| 23 | 0 | 1 | 1 | 1 | 1 |
| 24 | 1 | 0 | 0 | 0 | 0 |
| 25, 26 | 1 | 0 | 0 | 0 | 1 |
| 27, 28 | 1 | 0 | 0 | 1 | 0 |
| 29, 30 | 1 | 0 | 0 | 1 | 1 |
| 31, 32 | 1 | 0 | 1 | 0 | 0 |
| 33, 34 | 1 | 0 | 1 | 0 | 1 |
| 35, 36 | 1 | 0 | 1 | 1 | 0 |
| 37, 38 | 1 | 0 | 1 | 1 | 1 |
| 39, 40 | 1 | 1 | 0 | 0 | 0 |
| 41, 42 | 1 | 1 | 0 | 0 | 1 |
| 43 | 1 | 1 | 0 | 1 | 0 |
| 44 | 1 | 1 | 0 | 1 | 1 |
| 45 | 1 | 1 | 1 | 0 | 0 |
| 46 | 1 | 1 | 1 | 0 | 1 |
| 47 | 1 | 1 | 1 | 1 | 0 |
| 48 | 1 | 1 | 1 | 1 | 1 |

Naturally, the described basic principles of the invention are not limited to any certain transmission direction or device. They may be used in both uplink and downlink directions and in e.g. a mobile terminal and a network element (e.g. a base station (BS), a base station controller (BSC), or a combination thereof).

Figure 5:
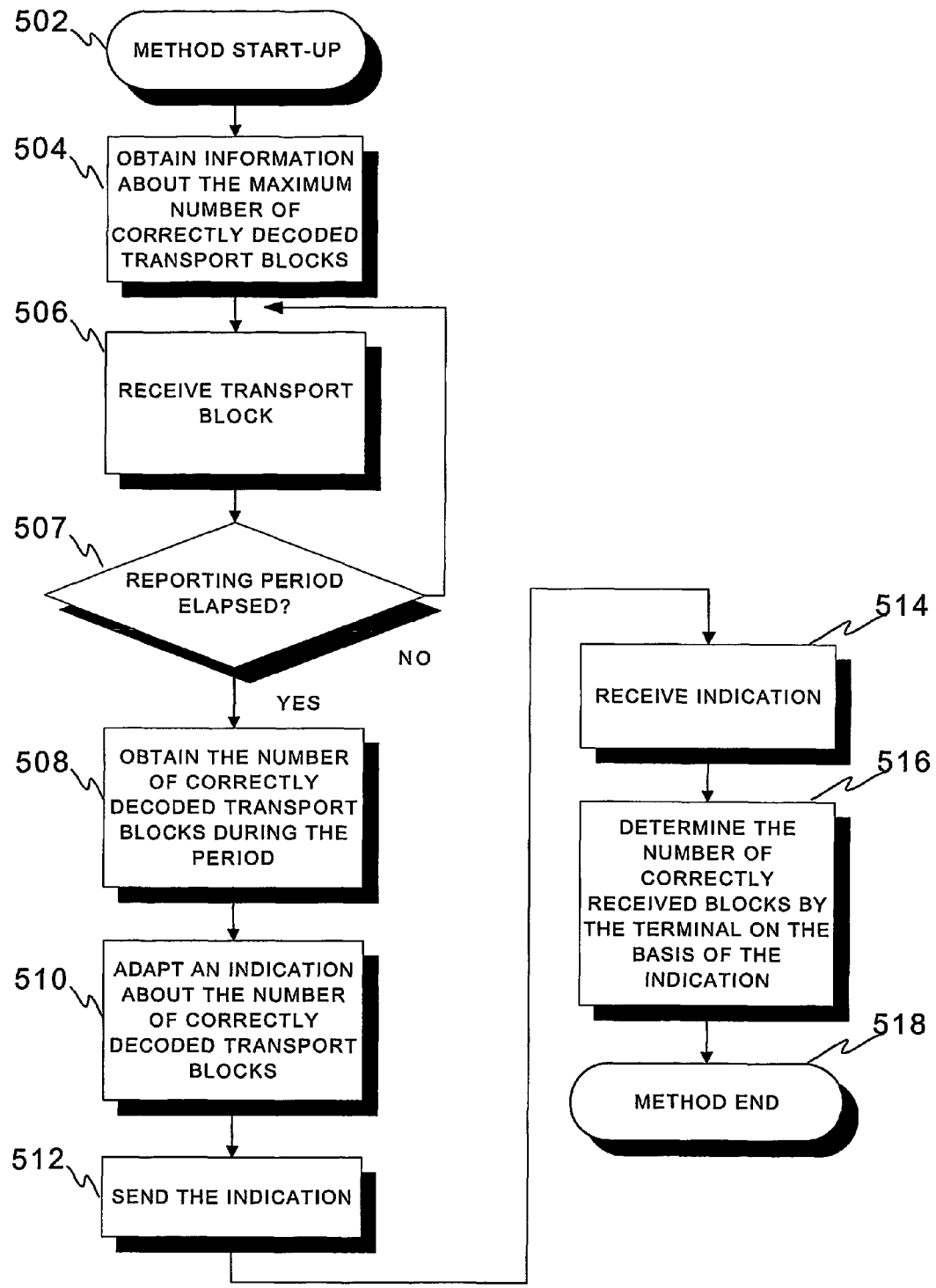
FIG. 5 discloses a flow diagram of the method of the invention.

FIG. 5 discloses a flow diagram of the method of the invention. At method start-up 502 a device, referring to a network entity (e.g. a BS, BSC, or a combination thereof) or to a wireless communication device like a mobile terminal may, for example, load the software performing the method of the invention to the memory and start execution. In addition, necessary memory areas can be initialised and communication connections established. In step 504 information about the maximum number of correctly decoded transport blocks is obtained. Such step may additionally or alternatively be executed after step 507 described later, this option depicted by dotted arrow in the figure, for example, which is advantageous especially if the TFCS is actually changed during the reporting period and therefore the maximum number of correctly decoded blocks is not known for sure until the reporting period has expired and the indication is about to be sent. Whenever several TFCSs are used during the reporting period, a number of different procedures can be performed for determining a proper NbTBmax. E.g. the NbTBmax can be defined as the maximum value of NbTBmax values of different TFCSs used during the reporting period, or NbTBmax can be constructed as the sum of the different NbTBmax values used. Reverting back to step 504 internals, the terminal may receive related basic data at call-set up, for example, when the TFCS and TFCs are determined and signalled, and then analyse the data as described hereinbefore with possible additional/special conditions in order to determine the required number. The information may also be obtained through a number of (partial) TFCS reconfigurations including deletion/addition/modifications of certain TFC(s)/TFs. The information may also be transmitted as such between the ends of a connection in question. The network element providing the information to the terminal may create it by itself or receive it from another network element.

In step 506 (and 507 in which it is checked if the current reporting period has elapsed) the terminal receives transport block(s) included in radio packet(s). The terminal determines the number of correctly decoded blocks in step 508 by utilizing the rules set forth hereinbefore. In step 510 the terminal adapts an indication of the determined number to be sent 512 (e.g. as a data field/parameter in a message) to the network. Adaptation can mean e.g. truncating a binary representation of said number if needed, selecting a proper element from a non-linear mapping table (see Table 4 for an example) etc. In step 514 the network element processing and/or analysing the number of correctly decoded blocks receives the indication thereof and decodes 516 it on the basis of the TFC/TFCS configuration in force during the reporting period about which the indication concerns. The network may utilize the decoded information to adapt some connection parameters (channel coding etc) to better match the prevailing and possibly altered communication environment. The method is ended in step 518.

Figure 6:
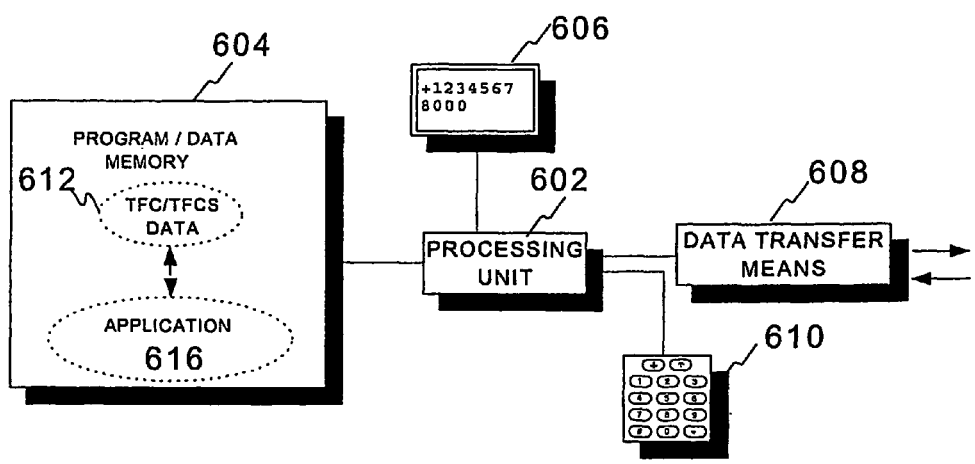
FIG. 6 discloses a block diagram of a device adapted to utilize the invention.

FIG. 6 depicts one option for basic components of a device like a network element (or a combination of separate elements) or a mobile terminal capable of processing and transferring data in accordance with the invention. Wording "mobile terminal" refers to, in addition to contemporary cellular phones, also to more sophisticated multimedia terminals, hand held and laptop computers etc capable of wireless communication. Memory 604, divided between one or more physical memory chips, comprises necessary code 616, e.g. in a form of a computer program/application, and configuration (TFCS/TFC/reporting period/additional rules & definitions for determination of maximum number/current number of transport blocks) data 612. Processing unit 602 is required for the actual execution of the method in accordance with instructions 616 stored in memory 604. Display 606 and keypad 610 are optional components often found useful for providing necessary device control and data visualization means (~user interface) to the user of the device. Data transfer means 608, e.g. a fixed data transmission interface or a radio transceiver or both, are required for handling data exchange, for example, receipt of configuration data from other devices and/or transmission of configuration data to other devices. Code 616 for the execution of the proposed method can be stored and delivered on a carrier medium like a floppy, a CD or a memory card.

The scope of the invention can be found in the following claims. It should be noted that utilized devices, method steps, adaptation techniques etc may vary depending on the scenario, still converging to the basic idea of this invention. For example, truncation of bits can be done differently to the presented examples, as well as the non-linear mapping. It's obvious that the parameter lengths may also differ from the ones presented hereinbefore.

REFERENCES

[1] 3GPP TR 45.902 V.6.2.0 Technical Specification Group GSM/EDGE, Radio Access Network; Flexible Layer One (Rel 6)
[2] 3GPP TS 45.002 V6.3.0 Technical Specification Group GSM/EDGE, Radio Access Network; Multiplexing and multiple access on the radio path (Rel 6)
[3] 3GPP TS 44.160 Technical Specification Group GSM/EDGE, General Packet Radio Service (GPRS); Mobile Station (MS)—Base Station System (BSS) interface; Radio Link Control/Medium Access Control (RLC/MAC) protocol Iu mode (Rel 6)
[4] 3GPP TS 44.118 Technical Specification Group GSM/EDGE, Radio Access Network; Mobile radio interface layer 3 specification; Radio Resource Control (RRC) protocol Iu Mode (Rel 5)
[5] 3GPP TS 45.008 Technical Specification Group GSM/EDGE Radio Access Network; Radio subsystem link control (Rel 6)
[6] 3GPP TS 44.018 Technical Specification Group GSM/EDGE Radio Access Network; Mobile radio interface layer 3 specification; Radio Resource Control (RRC) protocol (Rel 6)

The invention claimed is:

1. A method for a wireless system adapted to transfer data in radio packets over an air interface, the method comprising:
obtaining information about a maximum number of correctly decoded transport blocks during a reporting period at the latest when the reporting period has expired,
obtaining a number of correctly decoded transport blocks during the reporting period,
adapting an indication about said number of correctly decoded transport blocks into a transferable form on a basis of the obtained information about the maximum number of correctly decoded transport blocks, wherein the adapting comprises truncation of at least one bit of a binary representation of the number of correctly decoded transport blocks during the reporting period, and
sending said indication over the air interface.

2. The method of claim 1, wherein the maximum number of correctly decoded transport blocks is determined on the basis of transport blocks in which a cyclic redundancy check is used.

3. The method of claim 1, wherein the maximum number of correctly decoded transport blocks is determined on the basis of transport blocks associated with active transport channels.

4. The method of claim 1, wherein only a subset of all transport channels in a transport format combination set is taken into account.

5. The method of claim 1, wherein the maximum number of correctly decoded transport blocks is determined on the basis of the maximum number of active transport channels in a transport format combination of a transport format combination set on a dedicated physical subchannel.

6. The method of claim 1, wherein at least one transport format combination for signalling is omitted from both the maximum number of correctly decoded transport blocks during the reporting period and the number of correctly decoded transport blocks during the reporting period.

7. The method of claim 1, wherein in obtaining the number of correctly decoded transport blocks during the reporting period only the transport blocks in which a cyclic redundancy check is used are counted in, said counted in transport blocks considered as correctly decoded according to the cyclic redundancy check thereof.

8. The method of claim 1, wherein in obtaining the number of correctly decoded transport blocks during the reporting period all the received transport blocks are considered as correctly decoded provided that there is no transport format combination in a transport format combination set comprising at least one active transport channel utilizing a cyclic redundancy check.

9. The method of claim 1, wherein said adapting comprises a non-linear mapping.

10. The method of claim 1, wherein the system utilizes a flexible layer one in data transfer.

11. The method of claim 1, wherein the system utilizes a GSM/EDGE radio access network.

12. The method of claim 1, wherein the indication is sent in a nbr rcvd block parameter.

13. The method of claim 1, wherein the reporting period is a slow associated control channel reporting period, and the slow associated control channel is the channel on which the indication is transferred.

14. An apparatus operable in a wireless system adapted to transfer data in radio packets over an air interface, said apparatus comprising a processing unit and a memory comprising a computer program code, the memory and the computer program code configured to, with the processing unit, cause the apparatus to perform at least the following:
    obtain information about a maximum number of correctly decoded transport blocks during a reporting period, at the latest when the reporting period has expired,
    obtain the number of correctly decoded transport blocks during the reporting period,
    adapt an indication about said number of correctly decoded transport blocks into a transferable form on a basis of the obtained information about the maximum number of correctly decoded transport blocks, wherein the adapted indication comprises truncation of at least one bit of a binary representation of the number of correctly decoded transport blocks during the reporting period, and
    send said indication over the air interface.

15. The apparatus of claim 14, wherein adapting an indication is selected from the group of: truncation of at least one bit of a binary representation of the number of correctly decoded transport blocks during the reporting period, and a non-linear mapping.

16. The apparatus of claim 14, adapted to determine the maximum number of correctly decoded transport blocks on the basis of the maximum number of active transport channels in a transport format combination of a transport format combination set on a dedicated physical subchannel.

17. The apparatus of claim 14, adapted to take into account only the transport blocks utilizing a cyclic redundancy check in the maximum number of correctly decoded transport blocks during the reporting period.

18. The apparatus of claim 14, adapted to omit at least one transport format combination for signalling from both the maximum number of correctly decoded transport blocks during the reporting period and the number of correctly decoded transport blocks during the reporting period.

19. The apparatus of claim 14, adapted to consider the transport blocks as correctly decoded according to the cyclic redundancy check.

20. The apparatus of claim 14, adapted to consider the received transport blocks as correctly decoded provided that there is no transport format combination in a transport format combination set including at least one active transport channel utilizing a cyclic redundancy check.

21. The apparatus of claim 14 that is a mobile terminal.

22. The apparatus of claim 14 that utilizes a flexible layer one in data reception.

23. The apparatus of claim 14 that is operable in a GSM/EDGE radio access network.

24. The apparatus of claim 14 that utilizes a slow associated control channel to sent the indication.

25. An apparatus operable in a wireless system adapted to transfer data in radio packets over an air interface, said apparatus comprising a processing means unit and a memory comprising a computer program code, the memory and the computer program code configured to, with the processing unit, cause the apparatus to perform at least the following:
    obtain information about a maximum number of transport blocks transferred to a terminal over the air interface during a reporting period at the latest when the reporting period has expired,
    receive an indication about the number of correctly decoded transport blocks during the reporting period by the terminal, wherein the received indication comprises truncation of at least one bit of a binary representation of the number of correctly decoded transport blocks during the reporting period, and,
    on a basis of the obtained information about the maximum number of transport blocks transferred to a terminal and the received indication, determine the actual number of correctly decoded transport blocks.

26. The apparatus of claim 25 that is a base station, a base station controller, or a combination of a base station and a base station controller.

27. The apparatus of claim 25 that is operable in a GSM/EDGE radio access network.

28. The apparatus of claim 25, adapted to receive the indication on a slow associated control channel.

29. The method of claim 25, wherein the indication is received on a slow associated control channel.

30. A non-transitory medium tangibly encoded with a computer executable program configured to execute, when the computer executable program is run by a processor, a method for a wireless system adapted to transfer data in radio packets over an air interface with instructions that, when executed by the processor, perform:
    obtaining information about a maximum number of correctly decoded transport blocks during a reporting period at the latest when the reporting period has expired,
    obtaining a number of correctly decoded transport blocks during the reporting period,
    adapting an indication about said number of correctly decoded transport blocks into a transferable form on a basis of the obtained information about the maximum number of correctly decoded transport blocks, wherein the adapting comprises truncation of at least one bit of a binary representation of the number of correctly decoded transport blocks during the reporting period, and
    sending said indication over an air interface.

31. A method for a wireless system adapted to transfer data in radio packets over an air interface, the method comprising:
    obtaining information about a maximum number of transport blocks transferred to a terminal over the air interface during a reporting period at the latest when the reporting period has expired,
    receiving an indication about the number of correctly decoded transport blocks during the reporting period by the terminal, wherein the received indication comprises truncation of at least one bit of a binary representation of the number of correctly decoded transport blocks during the reporting period, and,
    on a basis of the obtained information about the maximum number of transport blocks transferred to a terminal and the received indication, determining the actual number of correctly decoded transport blocks.

32. The method of claim 31, wherein the system utilizes a GSM/EDGE radio access network.

33. A non-transitory medium tangibly encoded with a computer executable program configured to execute, when the computer executable program is run by a processor, a method for a wireless system adapted to transfer data in radio packets over an air interface with instructions that, when executed by the processor, perform:
- obtaining information about a maximum number of transport blocks transferred to a terminal over an air interface during a reporting period at the latest when the reporting period has expired,
- receiving an indication about the number of correctly decoded transport blocks during the reporting period by the terminal, wherein the received indication comprises truncation of at least one bit of a binary representation of the number of correctly decoded transport blocks during the reporting period, and,
- on a basis of the obtained information about the maximum number of transport blocks transferred to a terminal and the received indication, determining the actual number of correctly decoded transport blocks.

34. A method for a wireless system adapted to transfer data in radio packets over an air interface, the method comprising:
- obtaining information about a maximum number of correctly decoded transport blocks during a reporting period,
- obtaining a number of correctly decoded transport blocks during the reporting period,
- adapting an indication about said number of correctly decoded transport blocks during the reporting period into a transferable form on the basis of the obtained information about the maximum number of correctly decoded transport blocks during the reporting period, wherein said adapting comprises truncation of at least one bit of a binary representation of the number of correctly decoded transport blocks during the reporting period, and
- sending said indication about said number of correctly decoded transport blocks during the reporting period over the air interface.

35. A method for a wireless system adapted to transfer data in radio packets over an air interface, the method comprising:
- obtaining information about a maximum number of correctly decoded transport blocks during a reporting period,
- obtaining a number of correctly decoded transport blocks during the reporting period,
- adapting an indication about said number of correctly decoded transport blocks during the reporting period into a transferable form on the basis of the obtained information about the maximum number of correctly decoded transport blocks during the reporting period, and
- sending said indication about said number of correctly decoded transport blocks during the reporting period over the air interface,
- wherein when the maximum number of correctly decoded transport blocks comprises a value of about 64 to about 96, said adapting comprises truncation of two bits of a binary representation of the number of correctly decoded transport blocks during the reporting period,
- wherein when the maximum number of correctly decoded transport blocks comprises a value of about 32 to about 63, said adapting comprises truncation of one bit of a binary representation of the number of correctly decoded transport blocks during the reporting period, and
- wherein when the maximum number of correctly decoded transport blocks comprises a value of about 0 to about 31, said adapting comprises a direct binary representation without truncation.

* * * * *